US010445377B2

(12) United States Patent
Berk et al.

(10) Patent No.: US 10,445,377 B2
(45) Date of Patent: Oct. 15, 2019

(54) AUTOMATICALLY GENERATING A WEBSITE SPECIFIC TO AN INDUSTRY

(71) Applicant: Go Daddy Operating Company, LLC, Scottsdale, AZ (US)

(72) Inventors: Josh Berk, Scottsdale, AZ (US); Justin Tsai, San Francisco, CA (US); Daniel K. Hardy, Phoenix, AZ (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 782 days.

(21) Appl. No.: 14/884,510

(22) Filed: Oct. 15, 2015

(65) Prior Publication Data
US 2017/0109441 A1  Apr. 20, 2017

(51) Int. Cl.
| | | |
|---|---|---|
| G06F 16/00 | (2019.01) | |
| G06F 16/951 | (2019.01) | |
| H04L 29/08 | (2006.01) | |
| G06F 16/22 | (2019.01) | |
| G06F 16/245 | (2019.01) | |
| G06F 16/958 | (2019.01) | |
| G06F 16/2455 | (2019.01) | |
| G06F 16/33 | (2019.01) | |
| G06F 16/957 | (2019.01) | |
| G06F 16/2457 | (2019.01) | |
| G06F 17/22 | (2006.01) | |
| G06F 17/27 | (2006.01) | |
| G06F 17/21 | (2006.01) | |

(52) U.S. Cl.
CPC ............ *G06F 16/951* (2019.01); *G06F 16/22* (2019.01); *G06F 16/245* (2019.01); *G06F 16/2455* (2019.01); *G06F 16/24575* (2019.01); *G06F 16/3344* (2019.01); *G06F 16/958* (2019.01); *G06F 16/9577* (2019.01); *G06F 16/972* (2019.01); *G06F 17/212* (2013.01); *G06F 17/218* (2013.01); *G06F 17/227* (2013.01); *G06F 17/2294* (2013.01); *G06F 17/277* (2013.01); *G06F 17/2735* (2013.01); *H04L 67/02* (2013.01); *H04L 67/306* (2013.01)

(58) Field of Classification Search
CPC .......... G06F 17/3089; G06F 17/30864; G06F 17/30905; G06F 17/218; G06F 16/958; G06F 17/2735; H04L 67/02; H04L 67/306
See application file for complete search history.

(56) References Cited

U.S. PATENT DOCUMENTS

| | | |
|---|---|---|
| 8,166,013 B2 | 4/2012 | Bandaru et al. |
| 8,326,964 B1 | 12/2012 | Chourey et al. |
| 8,335,799 B2 | 12/2012 | Tymoshenko et al. |
| 8,515,941 B1 | 8/2013 | Avritch et al. |
| 9,292,691 B1 | 3/2016 | Hittel |

(Continued)

*Primary Examiner* — Leslie Wong
(74) *Attorney, Agent, or Firm* — Greenberg Traurig, LLP

(57) ABSTRACT

Systems and methods of the present invention provide for one or more server computers communicatively coupled to a network and configured to: store data records associated with an industry, with tags defining the content, layout or style of a website; aggregate industry related data records via data entry or extraction; receive a request to automatically generate a website in a specific industry; query a database for the most frequently occurring website features; and automatically generate the website according to the most frequently occurring website features.

17 Claims, 5 Drawing Sheets

(56) References Cited

U.S. PATENT DOCUMENTS

| | | |
|---|---|---|
| 2001/0011265 A1 | 8/2001 | Cuan et al. |
| 2007/0050427 A1 | 3/2007 | Atkin et al. |
| 2008/0189320 A1 | 8/2008 | Lee |
| 2008/0319950 A1* | 12/2008 | Lasa ................ G06F 17/30899 |
| 2009/0112839 A1 | 4/2009 | Fisher et al. |
| 2009/0119268 A1* | 5/2009 | Bandaru ............. G06F 17/2745 |
| | | 705/7.12 |
| 2009/0204478 A1 | 8/2009 | Kaib et al. |
| 2009/0222416 A1 | 9/2009 | Tymoshenko et al. |
| 2010/0088428 A1 | 4/2010 | Hendrickson et al. |
| 2010/0174748 A1 | 7/2010 | Stumpf et al. |
| 2010/0229081 A1 | 9/2010 | Rothbucher |
| 2010/0235411 A1 | 9/2010 | Bray |
| 2011/0023017 A1 | 1/2011 | Calvin |
| 2011/0307792 A1 | 12/2011 | Deluca |
| 2012/0102020 A1 | 4/2012 | Pearson |
| 2012/0154404 A1 | 6/2012 | Clement et al. |
| 2012/0173373 A1* | 7/2012 | Soroca .............. G06F 17/30867 |
| | | 705/26.3 |
| 2013/0046771 A1 | 2/2013 | Moitra et al. |
| 2013/0191723 A1* | 7/2013 | Pappas ................ G06F 17/2247 |
| | | 715/234 |
| 2013/0198619 A1 | 8/2013 | Sidhu |
| 2013/0311875 A1* | 11/2013 | Pappas ................ G06F 17/2247 |
| | | 715/234 |
| 2013/0339337 A1* | 12/2013 | Alkhateeb ......... G06F 17/30864 |
| | | 707/710 |
| 2014/0006930 A1* | 1/2014 | Hollis ................ G06F 17/2247 |
| | | 715/234 |
| 2014/0095463 A1 | 4/2014 | Pappas |
| 2014/0108373 A1* | 4/2014 | Abrahami ......... G06F 17/30893 |
| | | 707/706 |
| 2014/0149845 A1* | 5/2014 | Ansel ................ G06F 17/30705 |
| | | 715/234 |
| 2014/0195897 A1 | 7/2014 | Balinsky et al. |
| 2014/0215306 A1 | 7/2014 | Chiculita et al. |
| 2014/0337711 A1* | 11/2014 | Poole ................ G06F 17/3089 |
| | | 715/234 |
| 2015/0006333 A1 | 1/2015 | Silveira et al. |
| 2015/0007022 A1 | 1/2015 | Chen et al. |
| 2015/0039622 A1* | 2/2015 | Sampath-Kumar ........................ |
| | | G06F 17/3089 |
| | | 707/740 |
| 2015/0106687 A1* | 4/2015 | McLaughlin .......... G06Q 30/02 |
| | | 715/234 |
| 2015/0113384 A1 | 4/2015 | Tymoshenko et al. |
| 2015/0161086 A1 | 6/2015 | Wu et al. |
| 2015/0378685 A1 | 12/2015 | Kaplinger et al. |
| 2016/0055132 A1 | 2/2016 | Garrison et al. |
| 2016/0224991 A1 | 8/2016 | Mukherjee et al. |
| 2016/0224999 A1 | 8/2016 | Mukherjee et al. |
| 2017/0103050 A9* | 4/2017 | Underwood ........ G06F 17/2247 |
| 2017/0228711 A1 | 8/2017 | Chawla et al. |
| 2017/0357913 A1* | 12/2017 | Garrison .............. G06F 17/272 |

* cited by examiner

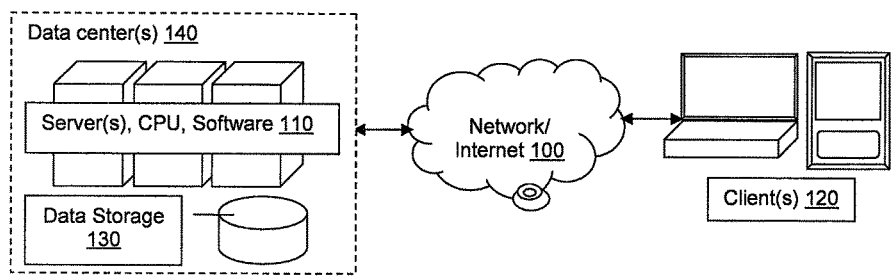
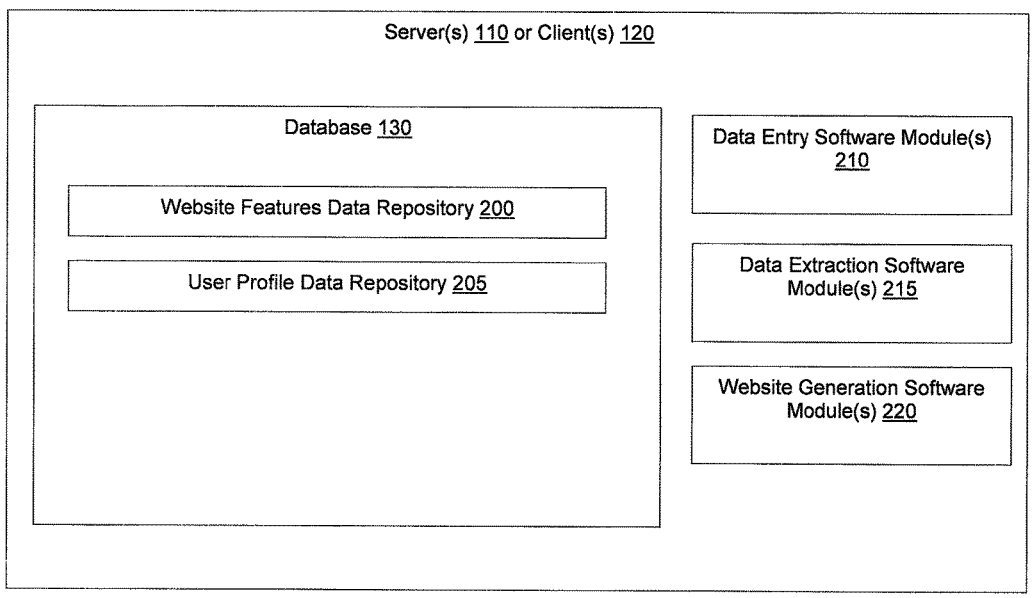
FIG. 1
FIG. 2

AUTOMATICALLY GENERATING A WEBSITE SPECIFIC TO AN INDUSTRY

FIELD OF THE INVENTION

The present invention generally relates to the field of website design and specifically to automatically generating and customizing a website based on a user profile and website characteristics (e.g., color, layout, text, images, widgets, etc.) relevant to the user's identified industry, geography, target customer demographic in the area, competitive dynamics in the industry and business goals.

SUMMARY OF THE INVENTION

The present invention provides systems and methods comprising one or more server computers communicatively coupled to a network and configured to: store data records associated with an industry, with tags defining the content, layout or style of a website; aggregate industry related data records via data entry or extraction; receive a request to automatically generate a website in a specific industry; query a database for the most frequently occurring website features; and automatically generate the website according to the most frequently occurring website features.

In another embodiment, The present invention provides systems and methods comprising one or more server computers communicatively coupled to a network and configured to: store data records associated with an industry, with tags defining the text content of a website; aggregate industry related data records via data entry or extraction; receive a request to automatically generate a website in a specific industry; query a database for the most frequently occurring text strings; and automatically generate the website according to the most frequently occurring text strings, wherein a first text sting is concatenated to a second text sting according to a relevance between them.

The above features and advantages of the present invention will be better understood from the following detailed description taken in conjunction with the accompanying drawings.

BRIEF DESCRIPTION OF THE DRAWINGS

FIG. 1 illustrates a possible system for generating and customizing a website according to industry website characteristics and the user's profile.

FIG. 2 illustrates a more detailed possible system for generating and customizing a website according to industry website characteristics and the user's profile.

DETAILED DESCRIPTION

Figure 3:
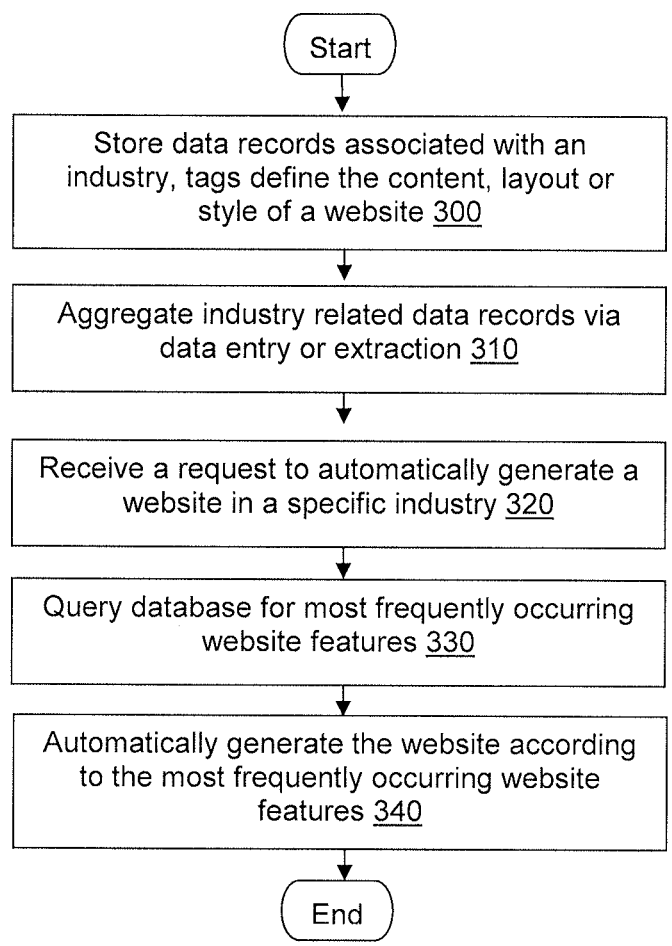
FIG. 3 illustrates a flow diagram for generating and customizing a website according to industry website characteristics and the user's profile.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet comprises a vast number of computers and computer networks that are interconnected through communication links. The interconnected computers exchange information using various services. In particular, a server computer system, referred to herein as a web server, may connect through the Internet to a remote client computer system and may send, to the remote client computer system upon request, one or more websites containing one or more graphical and textual web pages of information. A request is made to the web server by visiting the website's address, known as a Uniform Resource Locator ("URL"). Upon receipt, the requesting device can display the web pages. The request and display of the websites are typically conducted using a browser. A browser is a special-purpose application program that effects the requesting of web pages and the displaying of web pages.

Browsers are able to locate specific websites because each website, resource, and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

IP addresses, however, even in human readable notation, are difficult for people to remember and use. A URL is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name. An example of a URL with a HTTP request and domain name is: http://www.companyname.com. In this example, the "http" identifies the URL as a HTTP request and the "companyname.com" is the domain name.

Domain names are much easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a TLD and their corresponding IP addresses.

The process for registering a domain name with .com, .net, .org, and some other TLDs allows an Internet user to use an ICANN-accredited registrar to register their domain name. For example, if an Internet user, John Doe, wishes to register the domain name "mycompany.com," John Doe may initially determine whether the desired domain name is available by contacting a domain name registrar. The Internet user may make this contact using the registrar's webpage and typing the desired domain name into a field on the registrar's webpage created for this purpose. Upon receiving the request from the Internet user, the registrar may ascertain whether "mycompany.com" has already been registered by checking the SRS database associated with the TLD of the domain name. The results of the search then may be displayed on the webpage to thereby notify the Internet user of the availability of the domain name. If the domain name is available, the Internet user may proceed with the registration process. Otherwise, the Internet user may keep selecting alternative domain names until an available domain name is found. Domain names are typically registered for a period of one to ten years with first rights to continually re-register the domain name.

The information on web pages is in the form of programmed source code that the browser interprets to determine what to display on the requesting device. The source code may include document formats, objects, parameters, positioning instructions, and other code that is defined in one or more web programming or markup languages. One web programming language is HyperText Markup Language ("HTML"), and all web pages use it to some extent. HTML uses text indicators called tags to provide interpretation instructions to the browser. The tags specify the composition of design elements such as text, images, shapes, hyperlinks to other web pages, programming objects such as JAVA applets, form fields, tables, and other elements. The web page can be formatted for proper display on computer systems with widely varying display parameters, due to differences in screen size, resolution, processing power, and maximum download speeds.

For Internet users and businesses alike, the Internet continues to be increasingly valuable. More people use the Web for everyday tasks, from social networking, shopping, banking, and paying bills to consuming media and entertainment. E-commerce is growing, with businesses delivering more services and content across the Internet, communicating and collaborating online, and inventing new ways to connect with each other. However, presently-existing systems and methods for designing and launching a website require a user wishing to establish an online presence to navigate through a complicated series of steps to do so. First, the owner must register a domain name. The owner must then design a website, or hire a website design company to design the website. Then, the owner must purchase, configure, and implement website-related services, including storage space and record configuration on a web server, software applications to add functionality to his website, maintenance and customer service plans, and the like. This process can be complicated, time-consuming, and fraught with opportunity for user error. It may also be very expensive to produce, serve, and maintain the user's website. Merchants may be hesitant to create an online presence because of the perceived effort involved to do so. These merchants limit their business to offline "brick and mortar" points of sale.

Some existing website design approaches can simplify the design process through automation of certain of the design process steps. Typically, a user is provided a template comprising a fully or substantially hard-coded framework. The user must then customize the framework by providing content, such as images, descriptive text, web page titles and internal organizational links between web pages, and element layout choices. While the resulting website may be customized to the user's preferences and may present the desired information, the design process remains complicated and time-consuming because the user must identify, locate, prepare, and upload all of the desired content and then organize it within the web pages of the website.

Thus, current methods of website design may require extensive effort and provide limited options for the website designer. Website development software companies and/or web hosts may present a website operator with website design software, possibly comprising an interface allowing users to choose many categories to narrow down the industry associated with their website, then may direct the user to options that suggest templates. These templates may or may not fall into a category for the identified industry. To complete the website design, website designers must look through website themes, make a selection, and customize the selected website theme to match the desired website design.

In addition, once a website layout and/or style are selected, even if text is provided for the content of the website, the text tends to be pre-written content that is not customized for each user that selected the website template. The user is therefore left to face the time-consuming task of drafting and/or customizing the text for the website.

Therefore, optimal means for designing a website, including the disclosed invention, may comprise systems and methods including website designs that can be generated and customized based on a user profile and website characteristics (e.g., color, layout, text, images, widgets, etc.) relevant to the user's identified industry, geography, target customer demographic in the area, competitive dynamics in the industry and business goals (e.g., getting people to call, getting people to come into the customer's store, etc.). Such optimal means may coordinate colors, styles/effects, stock photography, localized language and layouts according to the user and the user's identified industry. The current invention therefore generates the content and theme for the website and tailors the website specifically to the user's identified industry and user profile, thereby reducing the need to look through website themes and customize them.

In addition, the disclosed invention may provide a bank of pre-written text customized to various industries and user profiles. The disclosed content engine may concatenate pre-written text together based on user preferences (including an identified industry) associated with a user profile for the operator of the website. The disclosed invention may also apply semantic analysis on text strings within the bank of pre-written text in order to concatenate the most relevant pieces of text together into industry-related text content for the website.

Several different environments may be used to accomplish the method steps of embodiments disclosed herein. FIG. 1 demonstrates a streamlined example and FIG. 2 demonstrates a more detailed example of an environment including a system and/or structure that may be used to accomplish the methods and embodiments disclosed and described herein. Such methods may be performed by any central processing unit (CPU) in any computing system, such as a microprocessor running on at least one server 110 and/or client 120, and executing instructions stored (perhaps as scripts and/or software, possibly as software modules/ components) in computer-readable media accessible to the CPU, such as a hard disk drive on a server 110 and/or client 120.

The example embodiments shown and described herein exist within the framework of a network 100 and should not limit possible network configuration or connectivity. Such a network 100 may comprise, as non-limiting examples, any combination of the Internet, the public switched telephone network, the global Telex network, computer networks (e.g., an intranet, an extranet, a local-area network, or a wide-area network), a wired network, a wireless network, a telephone network, a corporate network backbone or any other combination of known or later developed networks.

At least one server 110 and at least one client 120 may be communicatively coupled to the network 100 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

The example embodiments herein place no limitations on whom or what may comprise users. Thus, as non-limiting examples, users may comprise any individual, entity, business, corporation, partnership, organization, governmental entity, and/or educational institution that may have occasion to organize/import contacts and/or send marketing campaigns.

Server(s) 110 may comprise any computer or program that provides services to other computers, programs, or users either in the same computer or over a computer network 100. As non-limiting examples, the server 110 may comprise application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, a cloud hosting solution, a grid hosting solution, or any combination thereof) and may be used, for example to provide access to the data needed for the software combination requested by a client 120.

The server 110 may exist within a server cluster, as illustrated. These clusters may include a group of tightly coupled computers that work together so that in many respects they can be viewed as though they are a single computer. The components may be connected to each other through fast local area networks which may improve performance and/or availability over that provided by a single computer.

The client 120 may be any computer or program that provides services to other computers, programs, or users either in the same computer or over a computer network 100. As non-limiting examples, the client 120 may be an application, communication, mail, database, proxy, fax, file, media, web, peer-to-peer, or standalone computer, cell phone, personal digital assistant (PDA), etc. which may contain an operating system, a full file system, a plurality of other necessary utilities or applications or any combination thereof on the client 120. Non limiting example programming environments for client applications may include JavaScript/AJAX (client side automation), ASP, JSP, Ruby on Rails, Python's Django, PHP, HTML pages or rich media like Flash, Flex or Silverlight.

The client(s) 120 that may be used to connect to the network 100 to accomplish the illustrated embodiments may include, but are not limited to, a desktop computer, a laptop computer, a hand held computer, a terminal, a television, a television set top box, a cellular phone, a wireless phone, a wireless hand held device, an Internet access device, a rich client, thin client, or any other client functional with a client/server computing architecture. Client software may be used for authenticated remote access to a hosting computer or server. These may be, but are not limited to being accessed by a remote desktop program and/or a web browser, as are known in the art.

The user interface displayed on the client(s) 120 or the server(s) 110 may be any graphical, textual, scanned and/or auditory information a computer program presents to the user, and the control sequences such as keystrokes, movements of the computer mouse, selections with a touch screen, scanned information etc. used to control the program. Examples of such interfaces include any known or later developed combination of Graphical User Interfaces (GUI) or Web-based user interfaces as seen in the accompanying drawings, Touch interfaces, Conversational Interface Agents, Live User Interfaces (LUI), Command line interfaces, Non-command user interfaces, Object-oriented User Interfaces (OOUI) or Voice user interfaces. The commands received within the software combination, or any other information, may be accepted using any field, widget and/or control used in such interfaces, including but not limited to a text-box, text field, button, hyper-link, list, drop-down list, check-box, radio button, data grid, icon, graphical image, embedded link, etc.

The server 110 may be communicatively coupled to data storage 130 including any information requested or required by the system and/or described herein. The data storage 130 may be any computer components, devices, and/or recording media that may retain digital data used for computing for some interval of time. The storage may be capable of retaining stored content for any data required, on a single machine or in a cluster of computers over the network 100, in separate memory areas of the same machine such as different hard drives, or in separate partitions within the same hard drive, such as a database partition.

Non-limiting examples of the data storage 130 may include, but are not limited to, a Network Area Storage, ("NAS"), which may be a self-contained file level computer data storage connected to and supplying a computer network with file-based data storage services. The storage subsystem may also be a Storage Area Network ("SAN"—an architecture to attach remote computer storage devices to servers in such a way that the devices appear as locally attached), an NAS-SAN hybrid, any other means of central/shared storage now known or later developed or any combination thereof.

Structurally, the data storage 130 may comprise any collection of data. As non-limiting examples, the data storage 130 may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, and/or other means of data storage such as a magnetic media, hard drive, other disk drive, volatile memory (e.g., RAM), non-volatile memory (e.g., ROM or flash), and/or any combination thereof.

The server(s) 110 or software modules within the server(s) 110 may use query languages such as MSSQL or MySQL to retrieve the content from the data storage 130. Server-side scripting languages such as ASP, PHP, CGI/Perl, proprietary scripting software/modules/components etc. may be used to process the retrieved data. The retrieved data may be analyzed in order to determine the actions to be taken by the scripting language, including executing any method steps disclosed herein.

The software modules/components of the software combination used in the context of the current invention may be stored in the memory of—and run on—at least one server 110. As non-limiting examples of such software, the paragraphs below describe in detail the software modules/components that make up the software combination. These software modules/components may comprise software and/or scripts containing instructions that, when executed by a microprocessor on a server 110 or client 120, cause the microprocessor to accomplish the purpose of the module/component as described in detail herein. The software combination may also share information, including data from data sources and/or variables used in various algorithms executed on the servers 110 and/or clients 120 within the system, between each module/component of the software combination as needed.

A data center 140 may provide hosting services for the software combination, or any related hosted website including, but not limited to hosting one or more computers or servers in a data center 140 as well as providing the general infrastructure necessary to offer hosting services to Internet users including hardware, software, Internet web sites, hosting servers, and electronic communication means necessary to connect multiple computers and/or servers to the Internet or any other network 100.

FIG. 2 shows a more detailed example embodiment of an environment for the systems, and for accomplishing the method steps, disclosed herein. As non-limiting examples, all disclosed software modules may run on one or more server(s) 110 and/or one or more clients 120 and may include one or more user interfaces generated by the server(s) 110 and transmitted to and displayed on the client(s) 120. The user interface(s) may be configured to receive input from the user and transmit this input to the server(s) 110 for the administration and execution of the software, using data in data storage 130 associated with the software modules. Thus, the disclosed system may be configured to execute any or all of the method steps disclosed herein.

In FIG. 3, an administrative entity, such as a domain name registrar and/or website hosting service, may operate a database 130, possibly hosted on server(s) 110. This database may comprise a repository of website features data 200 and a repository of user profile data 205. (Step 300)

The website features repository 200 may comprise a collection of individual data records (or other data groupings), each defining a feature within a website and aggregated via data entry or extraction (Step 310). Each data record may define the website feature using: data identifying an industry (associated with the website feature and, in some embodiments, acting as the primary key throughout the repository); data classifying a class of website feature (e.g., content, layout, style, widget); one or more metadata elements or tags defining or describing the website feature; and a feature affinity data correlating each website feature with one or more other website features in the website features repository 200. Each data record may define this data at multiple levels of granularity.

To populate and index the website features repository 200, server(s) 110 may host and run one or more software modules. One or more data entry software modules 210 may receive website feature data for a particular industry from a crowd worker (possibly a single system administrator) via a displayed user interface, and may generate one or more website feature data records for that industry. One or more data extraction software modules 215 may extract website feature data from one or more crawled websites. This data extraction software 215 may perform an internet crawl, and for each crawled website, the data extraction software 215 may identify the industry associated with the website and extract the website feature data defining the website's content, layout and style. The data extraction software 215 may then generate individual data records from the extracted content, each data record defining, within a meta data and/or tag stored within one or more data fields, various characteristics of the content, layout or style of the crawled website. These data records may then each be stored in the website features repository 200 in association with the identified industry.

The website content features defined in the website features repository 200 may include any text or images input by the crowd worker(s) via the user interface in association with a specific industry, or any text or images extracted from the crawled websites associated with the specific industry.

The website layout features defined in the website features repository may include the relative positions of the content on the web pages input by crowd workers or extracted from the code of crawled websites (e.g., HTML table cells, <div>, <span> or <p> positions, etc.). To contain the received content and/or the relative positions of this content, the content and/or layout related data records (or possibly separate widget-related data records) may define industry-specific widgets identifying the type of widget content (e.g., text, image, etc.), the whitespace around that content, and the widget's relative position to other widgets or other content within the website.

The website style features defined in the website features repository 200 may include the trim, color or other theme-related attributes of the content, and/or any visual effects, animations or other dynamic theme attributes within the website, as input by crowd workers or extracted from the code of crawled websites.

The website features repository 200 may include an affinity table defining relationships between and correlating data records, possibly via common data between their metadata/tag data field and/or their feature affinity data fields. The website features repository 200 may use any combination of these data fields to index and map affinities and correlations between website feature data records for specific classes and/or for specific industries, thereby creating relationships and/or interconnections between data records and other data records. Once all data records are aggregated and their relationships and affinity defined, the administrator and/or crowd worker(s) may then review the aggregation and confirm the website feature definitions, relationships and affinities in the data records and the affinities table. The website features repository may also include a grammar reference for concatenating text string content together and run semantic analyses to validate logical content flow, including logical grammatical flow of concatenated relevant pieces of text. The affinity table and grammar reference may ensure that the automatically generated website is consistent and cohesive.

With the website features repository 200 populated, and relationships ensuring a consistent and cohesive website content established, a website generation software 220 may receive a request from a user, possibly via a user account control panel, to automatically generate a website specific to the industry associated with the user's business, and possibly personalized to the user's profile (Step 320). In some embodiments the user control panel may receive this request while a user is, for example, creating their user profile or registering a domain name. The industry associated with the user's business may be determined from a user's specific identification of the industry associated with the website, and/or may be extrapolated from user profile data (e.g., user's business name, contact info, preferences, etc.) stored within the repository of user profile data 205.

The website generation software may then query the website features repository 200 for all data records associated with the user's identified industry (Step 330). The website generation software may identify, within each of these data records, the category associated with the data records (e.g., a content, layout or style website feature), analyze the metadata/tags defining the content, layout or style feature, and determine the most frequently occurring website features, based on these tags. Using the affinity table and/or the appropriate affinity data in the data record, correlated website features may be correlated and combined. For example, the affinity table may define a "clean" theme, combining widgets with generous whitespace. Similarly, the affinity table and the grammar reference may be used to concatenate together text strings in a logical and readable order to be displayed as website content. Using the most frequently occurring and correlated website features, the website generation software may generate a website template for the user's identified industry (Step 340).

The website generation software may further personalize the website template to the user according to a user's profile within the repository of website user profile data 205. For example, using a user's preference for a simple (e.g., 1 over 3 display) or more complex (e.g., long scroll or complex multi-page display) content and layout, the website generation software may customize the generated website template accordingly. Similarly, the website generation software may analyze the content of similar websites or websites of the user's identified competitors (either by explicit identification by the user or using identification techniques described below), and automatically customize the generated website template to match website features on the similar or competitors' websites. The website generation software may further personalize the website template by applying any additional user profile elements from the user profile repository (e.g., similarities to the content, layout and style of other websites operated by the user). The content may be translated into additional languages, and the software may learn and refine its results.

Returning to step 300 of FIG. 3, an administrative entity, such as a domain name registrar and/or website hosting service, may operate a database 130, possibly hosted on server(s) 110. This database may comprise a repository of website features data 200 and a repository of user profile data 205.

The website features repository 200 may comprise a collection of individual data records (or other data groupings), each defining a feature within a website. The data records may be further broken down into specific data, such as a data field in a data record, for example. As non-limiting examples, Each data record may include: the website feature; data identifying an industry (associated with the website feature and, in some embodiments, acting as the primary key throughout the repository); a class of website feature (e.g., content, layout, style, widget); one or more metadata elements or tags defining or describing the website feature; and a feature affinity data correlating each website feature with one or more other website features in the website features repository 200.

Each data record may define this data at multiple levels of granularity. For example, multiple industry data fields may identify the industry as a service industry, while additional data fields identify the industry as medical, pediatrics, podiatry for children, etc. Multiple layout data fields may define a layout as a clean or simple layout (e.g., generous whitespace), a single page layout, a 3 over 1 layout, etc. Multiple style data fields may define the style as pastel, green, forest green, etc., and so forth. Each of the website feature data elements within each of these repositories may be populated, indexed according to associated and tagged metadata elements, and associated with an identified industry using any combination of human effort or automated technology.

To populate and index the website features repository 200, server(s) 110 may host and run one or more software modules. One or more data entry software modules 210 may receive website feature data for a particular industry from a crowd worker (possibly a single system administrator) via a displayed user interface, and may generate one or more website feature data records for that industry. The industry may be defined at any level of granularity, as noted above. For example, at the highest level, an industry may fall into one of five categories, for example personal, service-based local business, service-based online business, product-based local business or product-based online business. Each of these high-level categories may be further broken down according to industry, so the personal category may include subcategories for wedding businesses, resume building businesses, family photo services, etc.; the service-based local business category may include subcategories for doctors, plumbers, electricians, etc.; the service-based online business category may include sub categories for graphics editors, logo designers, etc.; the product-based local business category may include subcategories for local boutiques, for example; and the product-based online business may include subcategories for online shoe stores.

In some embodiments, crowd workers with the correct skill sets (e.g., selected based on their known subjects, expertise, previous experience, etc.) may contribute content including proper vocabulary level text, string length, images, etc., which may be relevant for a website in a specific industry. In light of these qualifications, the crowd workers may enter the data into the user interface of the data entry software 210 by being prompted to write sentences about specific topics that would be pre-sourced (e.g., "Tell us what a doctor does," "Tell us about doctor services and specialties," "Tell us about doctor pricing models and insurance issues," etc.)

In addition, these crowd workers may use their expertise and/or research of websites in the industry to analyze and aggregate the content (including text, string vocabulary, string lengths and images), layout, and style of these industry websites via the user interface in association with the identified industry. The first software may then generate data records within the website features repository 200 based on the received data, each data record focused on the identified industry and defining the content, layout and style of the website features. The crowd worker(s) may index each of the website feature data elements according to associated and tagged metadata elements in other data records.

One or more data extraction software modules 215 may extract website feature data from one or more crawled websites. This data extraction software 215 may perform an internet crawl, and for each crawled website, the data extraction software may identify the industry associated with the website and extract the website feature data defining the website's content, layout and style.

Any method known in the industry may be used to identify the industry associated with the crawled website. For example, the data extraction software 215 may parse local or other news sources and/or postings in industry review sites (e.g., Yelp, TripAdvisor, Yext) to identify websites within a certain industry. Proximate mentions of related or competing business websites may also be included. When the websites for a particular industry have been identified, the data extraction software 215 may identify keywords within the websites, and parse out common keywords. The data extraction software may also analyze website metadata tags and page descriptions via an SEO parser or run an analysis of EXIF meta tags within images pulled from the crawled websites. Crowd workers may also review the crawled websites and flag keywords within the website appropriately.

The keywords parsed from the crawled websites may include, as non-limiting examples, the most common keywords on the crawled websites, positive or negative sentiment of the websites' language, content in an "about us" section of the crawled websites, and comparisons of the services text (e.g., in a services page) with known industry keywords. A semantic analysis of these keywords may include, as non-limiting examples, a semantic analysis between the crawled websites and similar or competing industry websites.

The data extraction software 215 may then generate individual data records from the extracted content, each data record defining, within a meta data and/or tag stored within one or more data fields, various characteristics of the content, layout or style of the crawled website. These data records may then each be stored in the website features repository 200 in association with the identified industry.

The non-limiting example website seen in FIG. 5 may be used to both demonstrate the data entry 210 and data extraction 215 software modules, as well as an example of an automatically generated website, as described below. In the context of data entry or extraction, a crowd worker may review the Acme medical group websites and identify the website as associated with the medical industry. The crowd worker may also identify the website as having a 1 over 3 layout with text strings specific to the medical industry as a service and identify, within the content, 3 dimensional graphics and a slideshow. The crowd worker may then enter the appropriate data records via the data entry software 210.

Similarly, data extraction software 215 may crawl this website during an Internet crawl and identify keywords within the website identifying the website as associated with the medical industry (e.g., "medical," "health," "specialty," "practice"). The data extraction software may then analyze the code for the website as described above, and determine that the website has a 1 over 3 layout with text strings specific to the medical industry as a service and identify, within the content, 3 dimensional graphics and a slideshow. The data extraction software may then generate the appropriate data records.

Each data record for each of the website features associated with a particular industry may identify a category (e.g., content, layout, style) for that data record. These data records for a particular industry may therefore be grouped into sub-repositories of: 1) content (possibly further subdivided into text and images); 2) layout; and 3) style. In some embodiments, a category for widgets (described below) may include data records making up a widget sub-repository. For each category defined in a data field of a data record, additional data fields may define the feature of the content, layout or style via metadata and/or tags in the data fields.

The website content features defined in the website features repository 200 may include any text or images input by the crowd worker(s) via the user interface in association with a specific industry, and/or any text or images extracted from the crawled websites associated with the specific industry.

Any text content within the content repository may be subdivided into text strings, and any of these text strings may be concatenated together to generate content for the automatically generated website. The content repository may also comprise images. These images may have been entered by crowd workers, extracted from crawled websites and/or downloaded from a large community commons (i.e., free) library such as Flickr (which may already be associated with a specific industry) or from known social media outlets with one or more sets of attributes or parameters that describe the image (e.g., images tagged via Yelp to an industry).

The website layout features defined in the website features repository 200 may include the relative positions of the content on the web pages input by crowd workers or extracted from the code of crawled websites (e.g., HTML table cells, <div>, <span> or <p> positions, etc.). In other words, the layout of the web page may define the relative positions of logical blocks of information displayed on a web page and the position of the content within these logical blocks of information. A crowd worker may analyze a web page to determine the layout. The crowd worker may then create data records defining the layout of the web page in association with a specific industry. In embodiments where the layout is extracted from crawled industry websites, the data extraction software 215 may define the layout by extracting, analyzing and parsing HTML, CSS or JavaScript code within the crawled websites (e.g., HTML table cells and/or <div>, <span> or <p> tag relative positions), and generating data records defining the layout features via metadata and/or tags defining attributes or parameters of the layout feature.

To contain the received content and/or the relative positions of this content, the content and/or layout related data records (or possibly separate widget-related data records) may define industry-specific widgets identifying the type of widget content (e.g., text, image, etc.), the whitespace around that content, and the widget's relative position to other widgets or other content within the website. In other words, the metadata and/or tags for the layout data records may further define the position of the logical blocks of information within the layout of the web page (e.g., position of row or data field in an HTML table, relative position of <div>, <span> or <p> elements, etc.), the content stored within the logical blocks, and the amount of whitespace used in and between each of those blocks. Whitespace may be defined as the space between elements on a page where elements don't overlap and there is space between them, comprising "padding" or "margins." Additional metadata/tags in these data records may define the relative position of the blocks of data within the website, the content description (e.g., text, image, etc.) and/or the whitespace around that content within the information block. This data may be defined within layout or widget data records.

In some crowd-based embodiments, crowd workers may create industry based widgets as part of the theme, layout and/or style associated with an industry to hold content for an automatically generated website in that industry. The crowd workers may analyze websites and generate, within the layout repository, data records with meta data or tags defining the dimensions of a widget used on the website. In embodiments where websites are crawled, the crawler software may analyze the layout of the web page, including whitespace, determine a radius from the edge of any boundaries, and generate meta data or tags defining widgets, content and whitespace arranged according to the layout of the web pages. The generated widget metadata/tag may be analyzed to see if the determined radius crosses another widget for the analyzed web page, and if so, the data record may be updated to reflect that more whitespace needs to be added.

The website style features defined in the website features repository 200 may include the trim, color or other theme-related attributes of the content, and/or any visual effects, animations or other dynamic theme attributes within the website, as input by crowd workers or extracted from the code of crawled websites. In embodiments where style repository data records are entered by a crowd worker, general metadata and/or tags (e.g., "pastel," "green" or "clean") may be used to define the website. This metadata may be further refined to clarify that certain tag properties within HTML should be pastel or green, or that a clean style involves generous amounts of whitespace within widgets. In crawled website embodiments, the data extraction software 215 may analyze the HTML or JavaScript code, CSS properties, images, text, styles or metadata within the crawled websites and parse these properties to determine, for example, background colors, font style, colors or sizes, whether or not the site has rounded corners, how different items animate (e.g., sliders), etc.

The website features repository 200 may include an affinity database table correlating and defining relationships between data records, possibly via common data between their metadata/tag data field and/or their feature affinity data fields. The website features repository 200 may use any combination of these data fields to index and map affinities and correlations between website feature data records for specific classes and/or for specific industries, thereby creating relationships and/or interconnections between data records and other data records in the website features repository 200.

The software and data for automatically generating the website may be roughly analogous to a genome project. By analogy, interconnections within this software and data may be enabled, since the metadata and/or other tagging data in each data record may be indexed and mapped to other metadata and/or tags according to other associated and tagged metadata elements in other data records. The affinity database table may be accessible to the website feature repository 200, and may reflect the relationship between each of these elements and their associated industry in order to produce the automatically generated website feature within a consistent specific theme. The affinity table may map out the affinity between website feature elements, identify the propensity of using specific website feature elements based on certain properties, and further associate these specific website feature elements with the software engines described herein to ensure that items within the automatically generated website blend together. The affinity mapping these elements together may be determined and traced by crowd sourcing. to ensure they flow correctly and read properly for humans.

Figure 5:
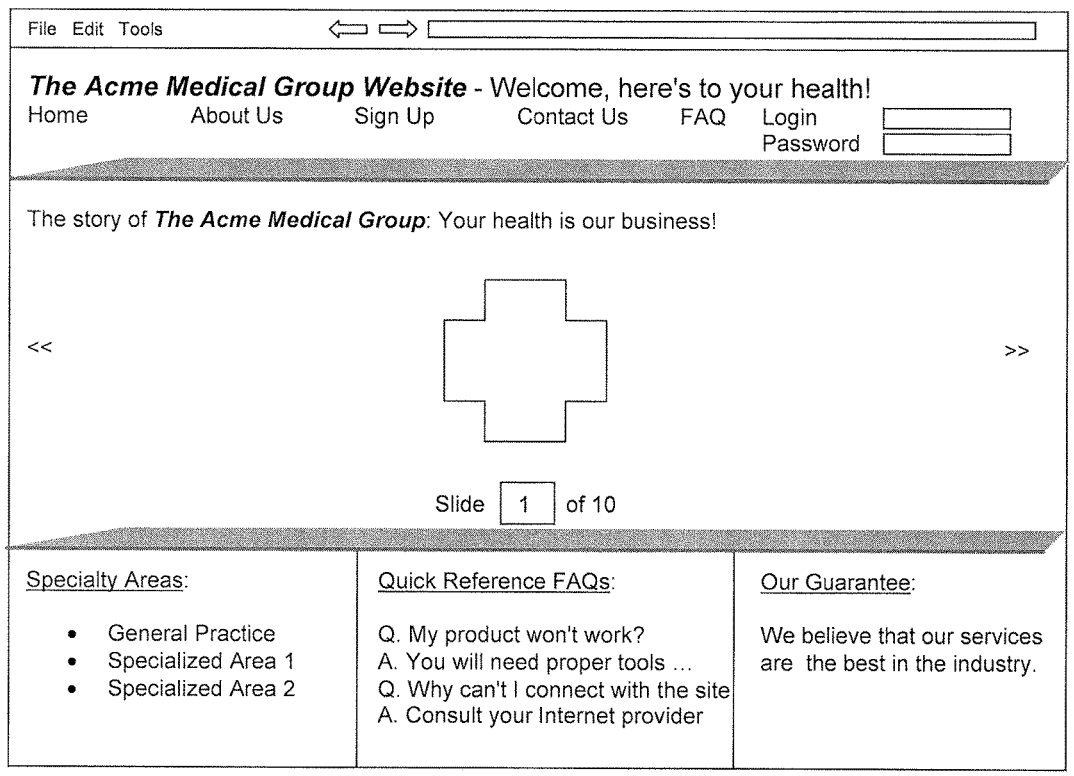
FIG. 5 is an example embodiment of a user interface used in generating and customizing a website according to industry website characteristics and the user's profile.

Using the medical services website in FIG. 5, the disclosed system may request a layout or website widgets designated as "clean," which would automatically generate a website and a theme associated with certain fonts and levels of whitespace within the website. To generate this theme within the automatically generated website, the system may recognize, within the repository, tags identifying whitespace and apply these tags to the website theme.

In addition to the affinities table, the website features repository 200 may also include a grammar reference for concatenating text string content together and run semantic analyses to validate logical content flow, including logical grammatical flow of concatenated relevant pieces of text. The affinity table and grammar reference may ensure that the content within the automatically generated website has cohesive and logical flow presented within a consistent theme.

Once all data records are aggregated and their relationships and affinity defined, the administrator and/or crowd worker(s) may then review the aggregation of data and confirm the website feature definitions, relationships and affinities in the data records and the affinities table.

In addition to storing a website features repository 200, server(s) 110 may be configured to store a user profile repository 205. This user profile repository 205 may be used to further customize the automatically generated website to the user's profile.

Server(s) 110 may be hosted by any entity, possibly a hosting provider, a domain name registrar, a website development company, any other software service provider or any combination thereof. To manage users of such a system, including individuals or organizations, server(s) 110 may host and run a user administration program such as GODADDY's MY ACCOUNT control panel for management of hosting and domain names, as a non-limiting example.

In such an administration control panel program, each user may be assigned a user id. This user id may identify transactions performed by each user. These transactions may be stored as data records in data storage 130, each data record including the user id to associate the user with the transaction in data storage 130. These transactions may comprise online activities to be logged and stored in association with the user id, to be analyzed by server(s) 110 in order to identify an industry associated with a user's business, customize the website according to these transactions, or accomplish any other steps disclosed herein.

As non-limiting examples of such activities, a user may desire to register a domain name and host a website. The user may search for a domain name, and/or view an online ad comprising metadata and/or keywords describing the ad and product. The user may click on this ad to access a website for registering a domain name or host a website. The keywords searched, any top-level domain names searched, the ad clicked on, the metadata and/or keywords associated with the ad, the destination website reached, and the navigation to reach it may all be logged and stored in association with the user id in the user profile repository.

Figure 4:
FIG. 4 is an example embodiment of a user interface used in generating and customizing a website according to industry website characteristics and the user's profile.

The user may then access a control panel similar to that seen in FIG. 4 in order to register the domain name or host a website. The user may be taken through an on-boarding process to register the domain name or host the website, where the user is asked a series of questions to determine the details of registering the domain name and/or hosting the website. For example, in FIG. 4, the user may be asked the name of a business associated with the domain name/website and an industry category that describes the business. The user may also identify any related or competing websites in the same industry. The user may also contact a customer support website or phone number, and ask several questions about the domain name and/or website hosting process. The user may then register the domain name or host the website. The user's answers to any questions in the on-boarding process, any questions to or answers from the customer support interaction, and the domain name ultimately selected or details about the website hosted, any additional websites hosted or products purchased, or any other user preferences, may all be logged and stored in association with the user id in the user profile repository.

The user may also provide several points of contact, which may be stored in the user profile repository 205 in association with the user id. Such contact data may include a phone or SMS number, an email address, a billing address, social media account data, etc. In some embodiments, this user contact data may be used to receive notices related to the disclosed invention.

In order to automatically generate a website, the disclosed system must determine an industry associated with the website. Data in the user profile repository 205 may be used to identify the industry associated with the website. The user's selection of an industry category in association with the website is the strongest indicator of the related industry. However, the related industry may also be extrapolated from any additional data stored in the user profile repository, as described above. For example, the user's contact information may be cross referenced against online databases (e.g., using an API for a reverse phone number search) or the domain name within the user's email address may identify the company for which the user works, and the disclosed system may identify the associated industry using any techniques described above.

With the website features repository 200 populated, and relationships ensuring a consistent and cohesive website content established, a website generation software 220 may receive a request from a user, possibly via a user account control panel, to automatically generate a website specific to the industry associated with the user's business, and possibly personalized to the user's profile. In some embodiments the user control panel may receive this request while a user is, for example, creating their user profile or registering a domain name. As seen in FIG. 4, the request to automatically generate the website may also include a specification by the user of whether the requested website's layout should be simple or complex.

In response to the automatic website generation request, the website generation software may then query the website features repository 200 for all data records associated with the user's identified industry. The industry associated with the user's business may be determined from a user's specific identification of the industry associated with the user's website, and/or may be extrapolated from user profile data (e.g., user's business name, contact info, preferences, etc.) stored within the repository of user profile data 205.

The website generation software 220 may identify, within each of these data records, the category associated with the data records (e.g., a content, layout or style website feature), analyze the metadata/tags defining the content, layout or style feature, and determine the most frequently occurring website features, based on these tags. This information may be aggregated to determine what the average for an industry is. For example the software may determine that, when looking at 1000 medical industry sites 78% of them use a white background with splashes of bright blue. Using the most frequently occurring website features, the website generation software may generate a website template, including the content, layout and style of the website for the user's identified industry.

The website generation software 220 may include a content software engine, which may query the database to retrieve all data records associated with the user's identified industry and the content category, ordered by most frequent to least frequently occurring content. Within the retrieved data records, the most frequently occurring text and images may be identified and applied to the automatically generated website as the website content.

The data records defining text for the website content may further comprise a bank of text strings each comprising uniquely created or imported strings and/or combinations of strings parsed together from various sources. These various sources for the text strings may include text strings pre-written by crowd workers, or may include extracted content imported during an Internet crawl. These combinations of strings from individual data records may be concatenated together to generate unique content relevant to the automatically generated website.

The content software engine may then run a semantic analysis on the generated string content including analysis of: the length of strings; the industry, region, language, and sophistication (e.g., professional services vs. casual) of potential website users as variables for context; cues from existing websites used to train the content software engine; and crowd sourcing used to validate the algorithm and ensure that strings match. The content software engine may also determine whether two strings should be concatenated together using the data records in the affinity table. If the affinity table shows a high affinity or correlation between two concatenated strings, those strings may make up at least a portion of the text content for the generated website.

In addition to the affinity and correlation between text strings determined by the affinity table, the database 130 may further comprise a separate database or database table comprising a separate set of "grammar rules," which the content software engine may use to apply a global set of language semantic relationships that would dictate rules (different for each language) between sentences formed by concatenating the text strings. The set of grammar rules may be stored with all of the relationships tagged so that the software knows how to run the semantic analysis against the concatenated strings.

Figure 6:
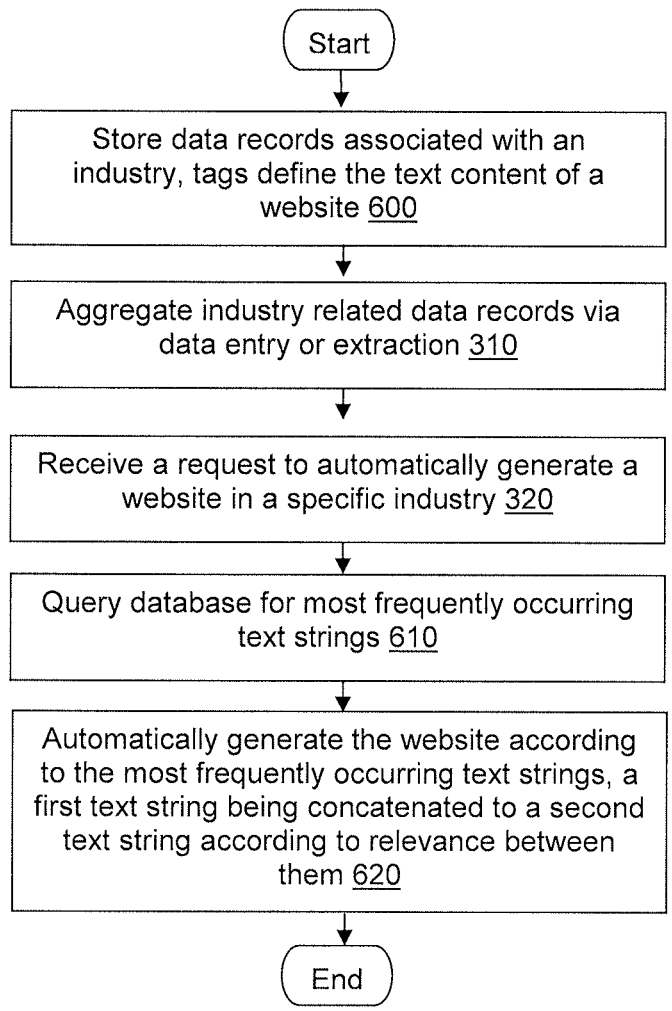
FIG. 6 illustrates a flow diagram for generating and customizing a website according to industry website characteristics and the user's profile.

Thus, as seen in FIG. 6, one or more server computers may be configured to: store a plurality of website text data records in a database in association with the industry (Step 600); aggregate the plurality of website text data records, each comprising at least one data field defining a text string within a website content, from a plurality of data entries of a plurality of parsed website content data associated with an industry (Step 310); receive a signal encoding a request to automatically generate a website and the industry to be associated with the website (Step 320); query the database for the plurality of website text data records comprising a most frequently occurring collection of common text strings within the content of the website (Step 610); and generate a website template according to the most frequently occurring collection of common text string and comprising a first text string concatenated to a second text string according to a determination of a relevance between the first text string and the second text string (Step 620).

The website generation software 220 may include a widget engine, which may query the database to retrieve all data records associated with the user's identified industry and the widget category, ordered by most frequent to least frequently occurring widget characteristics. The widget engine may work in conjunction with the content engine to analyze the features for the most frequently occurring widgets for the identified industry (e.g., text, image, size, position), as defined in the metadata/tags within the website feature repository 200, and may apply these widget features to the automatically generated website template. The content engine may then inject the text and/or image content into the appropriate widgets, based on widgets labeled to determine what type of content to insert into the widgets (e.g., image, content, widget size). Images may be inserted according to their size and location (e.g., looking for similar ratios to fill a 9×16 slot, or cropping or scaling if no such image is found)

The widget features may include a liquid layout internal to each defined widget and expandable as needed. For example, the content may fill 100% width of the space within the widget, but if there isn't enough text to fill it, the text and images (e.g., a map and headline) may remain a certain size. However, if the widget is expanded or contracted, then the text and/or images may grow or shrink proportionately in length to fill the space. Similarly, the widget engine may determine the size of a client on which the widget will be displayed (e.g., a mobile phone or tablet screen) in order to resize via client-side code of the widget engine, which may read the space it needs to render in (if it's coded with responsive web design principles), and resizing accordingly.

The website generation software 215 may include a layout engine, which may query the database to retrieve all data records associated with the user's identified industry and the layout category, ordered by most frequent to least frequently occurring widget characteristics. The widget engine may work in conjunction with the layout engine to analyze the features for the most frequently occurring widgets for the identified industry (e.g., text, image, size, position), as defined in the metadata/tags within the website feature repository 200, and may apply these widget features to the automatically generated website template. Specifically, the layout engine may analyze the layout of the web page, including whitespace, determine a radius from the edge of any boundaries, and generate widgets, including content and whitespace within and between the widgets arranged according to the layout of the web pages. The generated widget metadata/tag may be analyzed to see if the determined radius crosses another widget for the analyzed web page, and if so, the data record may be updated to reflect that more whitespace needs to be added.

The website generation software 220 may include a style engine, which may query the database to retrieve all data records associated with the user's identified industry and the style category, ordered by most frequent to least frequently occurring widget characteristics. As the style is established, images within the content of the website may be identified to be customized to the current website by: scaling or cropping the image to fit a designated space; color grading the image to better align to the overall site palette (for example making it use cooler tones).

Using the affinity table and/or the appropriate affinity data in the data record, correlated website features may be correlated and combined. For example, the affinity table may define a "clean" theme, combining widgets with generous whitespace. Similarly, the affinity table and the grammar reference may be used to concatenate together text strings in a logical and readable order to be displayed as website content. Using the most frequently occurring and correlated website features, the website generation software may generate a website template for the user's identified industry.

The website generation software 220 may then this user profile data may also be used to automatically generate and customize website characteristics (e.g., color, layout, text, images, widgets, etc.). These customized website characteristics may also be derived from the user's geography, target customer demographic in the area, competitive dynamics in the industry and business goals (e.g., getting customers to call, or getting customers to come into the store).

The website generation software may further personalize the website template to the user according to a user's profile within the repository of website user data 205. For example, using a user's preference for a simple (e.g., 1 over 3 display) or more complex (e.g., long scroll or complex multi-page display) content and layout, the website generation software may customize the generated website template accordingly. Similarly, the website generation software may analyze the content of similar websites or websites of the user's identified competitors (either by explicit identification by the user or using identification techniques described below), and automatically customize the generated website template to match website features on the similar or competitors' websites. The website generation software may further personalize the website template by applying any additional user profile elements from the user profile repository (e.g., similarities to the content, layout and style of other websites operated by the user)

The content may be translated into additional languages. The website generation software 220 may include a language engine that translates the completed website content. The translation may be entered via crowd workers, and the translated text may be sent from the website features repository to the translation engine in strings that would be translated (in context) and sent back to the website features repository 200 as a language pack. The amount of text translated/requested may be based on other competitor sites in the same industry.

The steps included in the embodiments illustrated and described in relation to FIGS. 1-6 are not limited to the embodiment shown and may be combined in several different orders and modified within multiple other embodiments. Although disclosed in specific combinations within these figures, the steps disclosed may be independent, arranged and combined in any order and/or dependent on any other steps or combinations of steps.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system, comprising:
    a database coupled to a network and storing:
        a plurality of website feature data records, each associated with an industry and comprising at least one tag or metadata element defining a content, a layout or a style of a website; and an affinity database table correlating and defining a relationship between at least one website feature data record and at least one additional website feature data record via:
- a first common data between at least one tag or metadata element field defining a website feature in at least one website feature data record and at least one additional website feature data record; or
- a second common data between an affinity data field in the at least one website feature data record and the at least one additional website feature data record;

at least one processor running on a server computer coupled to the network, the processor executing instructions causing the server computer to:
- aggregate the plurality of website feature data records from a plurality of data entries of a plurality of website feature data associated with the industry;
- store the plurality of website feature data records in the database in association with the industry;
- receive a transmission encoding:
  - a request to automatically generate a website; and
  - the industry to be associated with the website;
- query the database for the plurality of website feature data records;
- identify, within the plurality of website feature data records, a most frequently occurring collection of common tags or metadata elements defining the content, the layout or the style of the website;
- automatically generate the website according to the most frequently occurring collection of common tags or metadata elements; and
- publish the website.

2. The system of claim 1, wherein the plurality of data entries are received via:
- a data entry software generating a user interface displaying a plurality of questions about an industry and receiving a plurality of responses from a crowd worker; or
- a data extraction software comprising an Internet crawling software configured, for at least one crawled website to:
  - identify an industry for the at least one crawled website;
  - extract the plurality of website feature data from the at least one crawled website; and
  - aggregate the plurality of website feature data defining each of a plurality of extracted website feature data.

3. The system of claim 1, wherein each of the plurality of website feature data records comprises:
- an industry data field identifying the industry;
- a classification data field defining a website feature as a content, a layout or a style website feature;
- the at least one tag or metadata element data field defining the website feature; and
- the affinity data field correlating the at least one tag or metadata element with at least one additional tag or metadata element.

4. The system of claim 1, wherein:
the content comprises a plurality of text or at least one image;
the layout defines the relative position of the content on the website;
the content is defined within at least one widget data record defining a relative position of the content on the website; and the style defines a theme, at least one color, at least one background, at least one font, at least one visual effect or at least one animation for the website.

5. The system of claim 1, wherein the plurality of website feature data records are reviewed by at least one crowd worker to confirm human readability of at least one website feature data and at least one affinity or relationship of the at least one website feature data.

6. The system of claim 1, further comprising a plurality of user profile data records stored in the database in association with a user identification identifying the user that generated the request, wherein the at least one user preference comprises:
- a complex or simple layout of the website;
- at least one similar websites hosted by the user; and
- at least one competitor website.

7. A system, comprising at least one processor running on a server computer coupled to a network, the processor executing instructions causing the server computer to:
- aggregate a plurality of website feature data records, each comprising at least one data field defining a content, a layout or a style of the website, from a plurality of data entries of a plurality of website feature data associated with an industry;
- store the plurality of website feature data records in a database in association with the industry, the database further comprising:
  - an affinity database table correlating and defining a relationship between at least one website feature data record and at least one additional website feature data record via:
    - a first common data between at least one tag or metadata element field defining a website feature in at least one website feature data record and at least one additional website feature data record; or
    - a second common data between an affinity data field in the at least one website feature data record and the at least one additional website feature data record;
- receive a transmission encoding:
  - a request to automatically generate a website; and
  - the industry to be associated with the website;
- query the database for the plurality of website feature data records;
- identify within the plurality of website feature data records, a most frequently occurring collection of common data fields defining the content, the layout or the style of the website; and
- automatically generate the website according to the most frequently occurring collection of common data fields.

8. The system of claim 7, wherein the plurality of data entries are received via:
- a data entry software generating a user interface displaying a plurality of questions about an industry and receiving a plurality of responses from a crowd worker; or
- a data extraction software comprising an Internet crawling software configured, for at least one crawled website to:
  - identify an industry for the at least one crawled website;
  - extract the plurality of website feature data from the at least one crawled website; and
  - aggregate the plurality of website feature data defining each of a plurality of extracted website feature data.

9. The system of claim 7, wherein each of the plurality of website feature data records comprises:
an industry data field identifying the industry;

a classification data field defining a website feature as a content, a layout or a style website feature;
at least one tag or metadata element data field defining the website feature; and
the affinity data field correlating the at least one tag or metadata element with at least one additional tag or metadata element.

10. The system of claim 7, wherein:
the content comprises a plurality of text or at least one image;
the layout defines the relative position of the content on the website;
the content is defined within at least one widget data record defining a relative position of the content on the website; or
the style defines a theme, at least one color, at least one background, at least one font, at least one visual effect or at least one animation for the website.

11. The system of claim 7, wherein the plurality of website feature data records are reviewed by at least one crowd worker to confirm human readability of at least one website feature data and at least one affinity or relationship of the at least one website feature data.

12. The system of claim 7, further comprising a plurality of user profile data records stored in the database in association with a user identification identifying the user that generated the request, wherein the at least one user preference comprises:
a complex or simple layout of the website;
at least one similar websites hosted by the user; and
at least one competitor website.

13. A method, comprising the steps of:
aggregating, by a server computer coupled to a network, a plurality of website feature data records, each comprising at least one data field defining a content, a layout or a style of the website, from a plurality of data entries of a plurality of website feature data associated with an industry;
storing, by the server computer, the plurality of website feature data records in a database in association with the industry, the database further comprising:
an affinity database table correlating and defining a relationship between at least one website feature data record and at least one additional website feature data record via:
a first common data between at least one tag or metadata element field defining a website feature in at least one website feature data record and at least one additional website feature data record; or
a second common data between an affinity data field in the at least one website feature data record and the at least one additional website feature data record;
receiving, by the server computer, a transmission encoding:
a request to automatically generate a website; and
the industry to be associated with the website;
querying, by the server computer, the database for the plurality of website feature data records;
identifying, by the server computer, within the plurality of website feature data records, a most frequently occurring collection of common data fields defining the content, the layout or the style of the website; and
automatically generating, by the server computer, the website according to the most frequently occurring collection of common data fields.

14. The method of claim 13, further comprising the step of receiving, by the server computer, the plurality of data entries via:
a data entry software generating a user interface displaying a plurality of questions about an industry and receiving a plurality of responses from a crowd worker; or
a data extraction software comprising an Internet crawling software configured, for at least one crawled website to:
identify an industry for the at least one crawled website;
extract the plurality of website feature data from the at least one crawled website; and
aggregate the plurality of website feature data defining each of a plurality of extracted website feature data.

15. The method of claim 13, wherein each of the plurality of website feature data records comprises:
an industry data field identifying the industry;
a classification data field defining a website feature as a content, a layout or a style website feature;
at least one tag or metadata element data field defining the website feature; and
the affinity data field correlating the at least one tag or metadata element with at least one additional tag or metadata element.

16. The method of claim 13, wherein:
the content comprises a plurality of text or at least one image;
the layout defines the relative position of the content on the website;
the content is defined within at least one widget data record defining a relative position of the content on the website; or
the style defines a theme, at least one color, at least one background, at least one font, at least one visual effect or at least one animation for the website.

17. The method of claim 13, wherein the plurality of website feature data records are reviewed by at least one crowd worker to confirm human readability of at least one website feature data and at least one affinity or relationship of the at least one website feature data.

* * * * *